INVENTORS
PRESTON D. RIGTERINK
GEORGE E. FRANCE
BY
ATTORNEYS

United States Patent Office 3,137,270
Patented June 16, 1964

3,137,270
ANIMAL BUILDING CLEANING SYSTEM
Preston D. Rigterink and George E. France, Holland, Mich., assignors to Automatic Poultry Feeder Company, Zeeland, Mich., a corporation of Michigan
Filed Dec. 28, 1961, Ser. No. 162,808
2 Claims. (Cl. 119—16)

This invention relates to animal raising, and more particularly to a structure enabling close quarter raising of hogs under conditions of optimum efficiency and sanitation.

Many stock animals strive to remain cool in the warmer months of the year. Hogs, to remain cool, are known for their tendency to dig into cool, but filthy mud, dirt, and other debris in the hog pen. It has actually been determined scientifically that hogs do thrive in certain temperature ranges, and in fact the ratio of weight gain to feed consumed is remarkably high in the temperature range of 60 to 70 degrees Fahrenheit, being more than 100% greater than at 20–30° F. above or below this range. (U.S. Department of Agriculture, Miscellaneous Publication No. 774).

However, even though pigs gain weight more rapidly when kept in this cool temperature range, their habits of wallowing in mud and manure to remain cool are extremely unsanitary. Further, in order to keep the manure in a pig yard to a minimum, either the pig yard must use a great deal of space, or it must be constantly cleaned. This problem of cleaning is even more acute if the pigs are kept inside pig houses. Even with constant tedious and time consuming cleaning of such houses, manure build-up creates filthy conditions thereby increasing the probability of diseased hogs.

It is an object of this invention to provide a hog enclosure structure enabling the raising of hogs in especially close quarters without any outside pens being required, and with the hogs actually remaining clean and sanitary with no manure on the floor. The novel structure eliminates constant manual removal of the manure and actually causes the hogs to trample the manure out of the enclosure through a special floor. The novel enclosure requires no bedding, yet keeps the hogs dry and away from floor drafts in the cold months. In addition, it minimizes exposure of the hogs to flies. It has been found that the novel enclosure can readily handle twice as many hogs as an ordinary enclosure with a concrete floor, and with far less labor and greatly increased sanitation. The hogs are also fed and watered inside the close-quarter enclosure, preferably by automatic supply means to thereby supplement the manure removal and streamline pig-farming.

It is another object of this invention to provide a close-quarter animal enclosure as above wherein the animals are simultaneously kept cool and clean by an overhead water spray and controlled ventilation, with the water spray also serving to help clean the novel floor through which the manure is constantly trampled and removed by the hogs.

Other objects of this invention will be apparent from a study of the following specification in conjunction with the drawings in which:

FIG. 4 is a schematic diagram of one type of disposal system for the dissolved and suspended manure.

Basically, the invention comprises a hog raising building including feeding and watering means, and having a slatted floor including slots wide enough to enable the hogs to trample manure therethrough. Under the entire floor area is a pit substantially filled with water and generally slanted toward a drain opening controlled by a valve to enable periodic draining of the pit water and the manure dissolved and suspended therein. The drain opening leads to a reservoir located adjacent said building and having a refuse receiving portion below the level of the pit. The invention also includes, in one form, the above components in combination with a water spray system above the animals to both cool and clean the animals, and to help clean the slatted floor by washing remaining manure particles into the trough.

Figure 1:
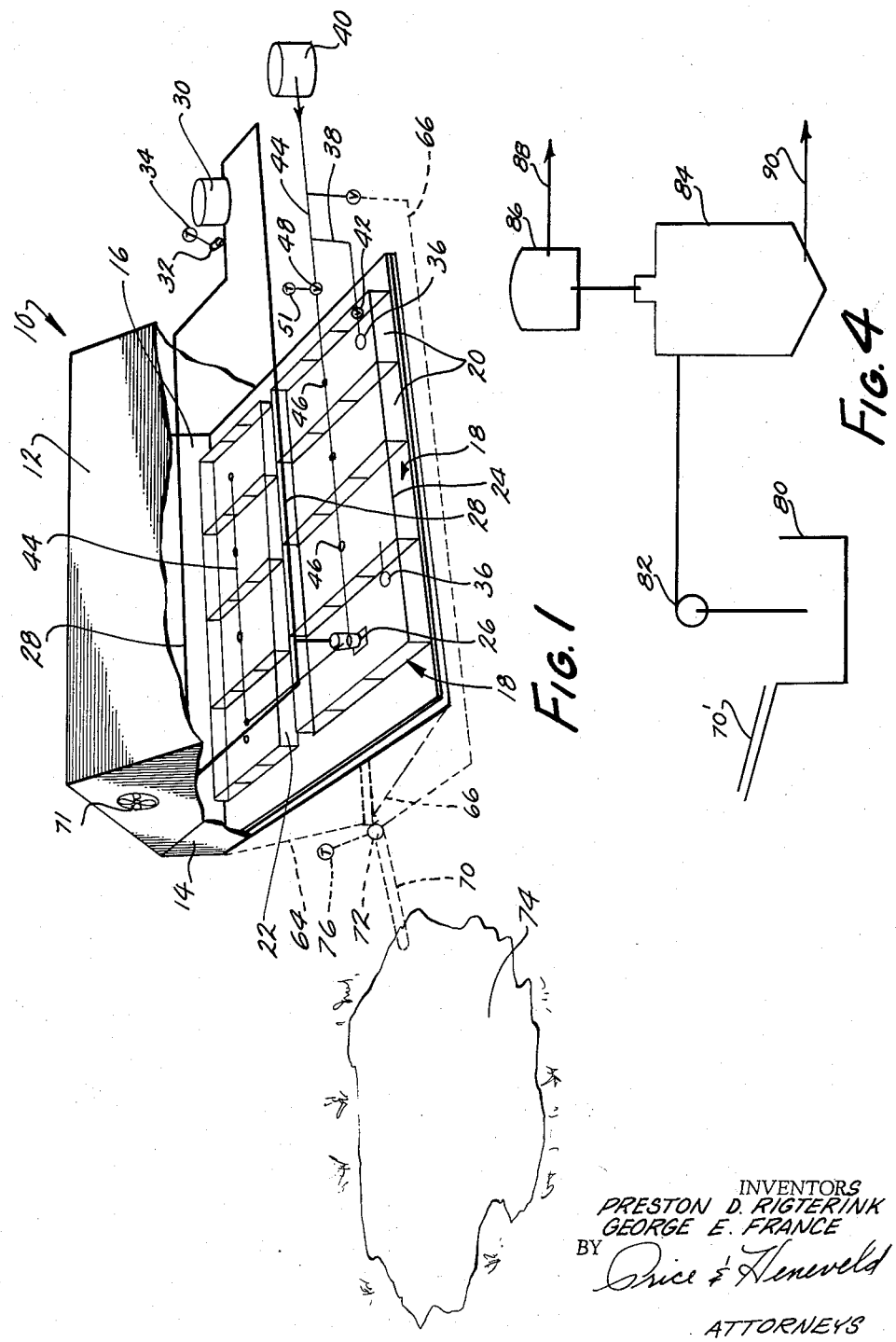
FIG. 1 is a perspective, cutaway, partially schematic view of one form of the novel hog enclosure.
Figure 2:
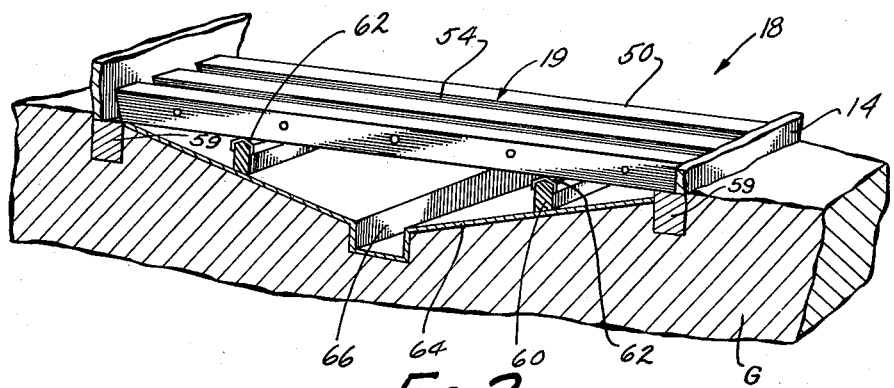
FIG. 2 is a fragmentary enlarged perspective view of one end of the structure illustrated in FIG. 1 showing the slatted floor construction and underlying components.

Referring now to FIG. 1, in the form of the invention illustrated the animal raising building 10 includes a suitable roof 12, end walls 14, side walls 16, and a special floor structure 18 all constructed on the ground adjacent a lagoon reservoir 74.

Depending upon the size of the enclosure, the floor area of the floor structure 18 may be divided, by fencing 24, into a series of adjacent pens 20, here shown in the drawings along both sides of the house and divided by a central aisleway 22. Each pen is supplied with a feeder 26, one of which is shown in the end pen. All of the feeders are supplied by feed conveyor 28 from an exterior storage bin 30. A suitable conveyor motor 32 operated by a timer 34 may be utilized to periodically supply feed to the several feeders in the pens. Likewise, each pen is provided with a hog watering cup 36 supplied by water pipe 38 from reservoir 40. The water cups may be of any conventional type and may include a snout operated control valve 42 adjacent each cup, if desired. Water is also supplied through pipeline 44 to a series of spraying heads 46 over the respective pens. A control valve 48 and timer 51 cause the spray heads 46 to eject water periodically to cool and clean the hogs or other animals and to also help wash the slatted floor.

Figure 3:
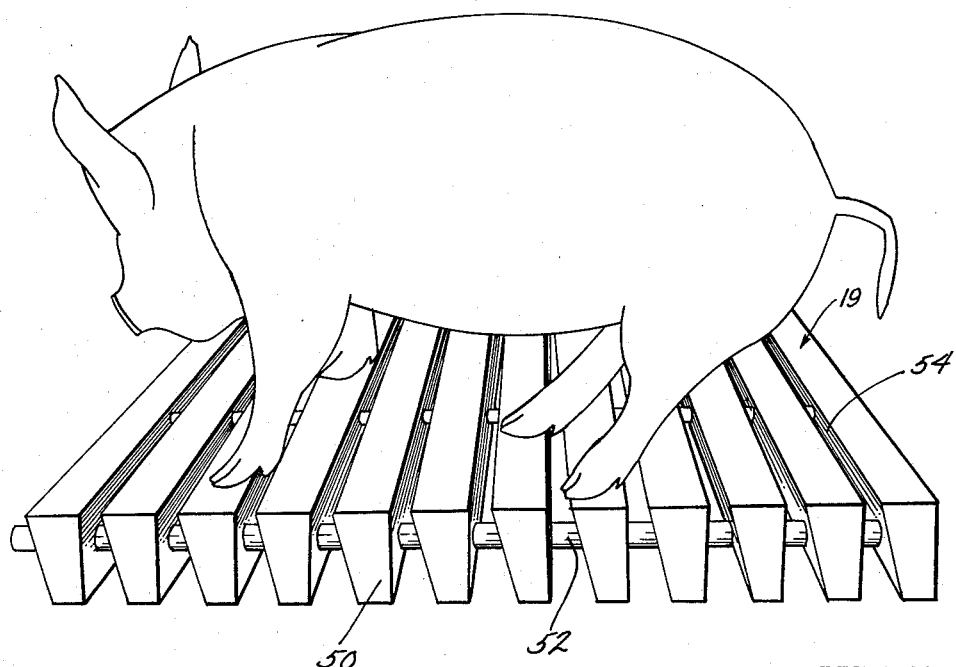
FIG. 3 is an enlarged perspective fragmentary view of one section of the novel floor utilized in the enclosure of FIGS. 1 and 2 and its relationship to a hog.

The animal support surface 19 of the floor structure 18 of the enclosure is made up of a plurality of slats 50, preferably of wood, and which preferably have a cross section tapered inwardly from top to bottom as illustrated in FIG. 3. These slats could be made of other equavalent material such as concrete, metal, etc. The slats may be connected together by elongated dowel pins 52. Elongated slots 54, preferably about ½ inch in width at the top, are left between the slats to enable manure to be trampled therethrough by the hogs. The inward taper at the bottom of the slats prevents manure from hanging-up between them. This floor surface may be mounted in sections and is preferably supported by a suitable peripheral foundation 59 in the ground G and a plurality of central beams 60 which include tapered cover guards 62 to prevent hang-up of the manure. The floor structure 18 also includes a water pit 64 located beneath the floor surface and having sides which preferably slant toward the center trough portion 66, with the latter defining an elongated conduit means. This trough 66 preferably slants from one end of the building (the right end of the building in FIG. 1) to the other end where a drain conduit 70 controlled by drain valve 72 may conduct the water and dissolved manure to a suitable reservoir 74 in the ground adjacent the building. The valve 72 may be controlled manually or by a suitable timer 76 as desired.

During use, hogs are placed in the pens 20 in relatively close quarters and periodically provided with food through the conveyor system 28 to the feeders 26. Water is constantly supplied to the cups 36 as needed by the animals. Water is periodically sprayed from heads 46 as controlled by valve 48 and timer 51 depending upon the outside temperature. The ventilation to the building is controlled by a suitable exhaust fan 71. The sprayed water passes through the elongated slots 54 to keep the floor dry and also to help clean the slats as it passes into pit 64. Valve 72 is periodically opened as by timer 76 to drain water and dissolved and suspended manure from the trough. The water flows down the sides of the trough to the center conduit means 66 and through conduit 70 into a reservoir such as lagoon 74.

Instead of flowing the refuse into an open lagoon to allow evaporation to remove the liquid, the dissolved manure may be passed through a conduit 70' (FIG. 4) leading from the trough 64 to a temporary reservoir 80 having a refuse receiving portion located below the level of the pit and then passed by pump 82 to a sealed tank or vessel 84. The lack of oxygen causes the development of bacteria and resulting decomposition of the complex organic solids in the manure. This converts them to acids and alcohols, which are further decomposed to form methane gas which passes into a sealed gaseous container 86, and to form other residue remaining in the vessel 84. The gas may be tapped at 88 and used for heating the animal house in the winter if desired. The residue may be drained off at 90 and utilized for fertilizer.

It will be readily realized that the novel system causes all of the needs of the animals to be readily supplied in clean, comfortable, cool surroundings to achieve maximum efficiency, cleanliness, and waste-product usefulness, and with a minimum of labor and area. Various other advantages will be apparent upon studying the foregoing specification, as well as modifications thereof, without departing from the principles of the invention as taught. Thus, the inventive concepts disclosed are not to be limited to the specific form illustrated, but only by the scope of the appended claims and the reasonable equivalents thereto.

We claim:

1. An animal building for raising animals in a compact, sanitary area comprising: a building constructed on a ground surface and having under at least the major portion thereof a floor structure for animal occupancy, said floor structure comprising a slatted floor means with a water retaining pit thereunder, said pit normally containing water at a level so as to cover the entire bottom of the pit to receive animal discharge and form slurry thereof and said slatted floor means being mounted a distance above the level of said water; a reservoir located in the ground adjacent said building and having a refuse receiving portion located below the level of said pit; means interconnecting said pit and reservoir; releasable retaining means for retaining the water in said pit but permitting removal of said water to said reservoir by the releasing of said retaining means; and water spray means mounted over said slatted floor means for spraying said animals to cool the same and whereby said water from said spray means passes through said slatted floor means to clean the same and help maintain the water level to counteract water losses due to evaporation.

2. An animal building for raising animals in a compact, sanitary area comprising: a building constructed on a ground surface and having under at least the major portion thereof a floor structure for animal occupancy, said floor structure comprising a slatted floor means to support animals thereon while allowing refuse to fall through said slotted floor means with a water retaining pit thereunder, said pit normally containing water at a level so as to cover the entire bottom of the pit and said slatted floor means being mounted a distance above the level of said water; a trough portion running through said pit at a level below the remainder of said pit with said remainder being slanted toward said trough portion to provide complete drainage from said pit without significant buildup of solids thereon during drainage; a reservoir located in the ground adjacent said building and having a refuse receiving portion located below the level of said trough portion; means interconnecting said trough portion and reservoir; releasable retaining means for retaining the water in said pit but permitting removal of said water to said reservoir by the releasing of said retaining means; and water spray means mounted over said slatted floor means for spraying said animals to cool the same and whereby said water from said spray means passes through said slatted floor means to clean the same.

References Cited in the file of this patent

UNITED STATES PATENTS

| 1,711,004 | Youngman | Apr. 30, 1929 |
| 2,255,806 | Overson | Sept. 16, 1941 |
| 2,523,615 | Fell | Sept. 26, 1950 |
| 2,652,024 | Coyner | Sept. 15, 1953 |
| 2,881,733 | Young et al. | Apr. 14, 1959 |
| 2,969,040 | Siptrott | Jan. 24, 1961 |

FOREIGN PATENTS

| 859,081 | Germany | Dec. 11, 1952 |
| 1,005,309 | Germany | Mar. 28, 1957 |

OTHER REFERENCES

Farm Journal, "Poultry," June 1961, page 44.

D & H Manufacturing Company and MSU File #18,113, June 1961.